US010666791B2

(12) United States Patent
Makagon et al.

(10) Patent No.: US 10,666,791 B2
(45) Date of Patent: May 26, 2020

(54) SYSTEM AND METHOD FOR EVALUATING THE QUALITY OF A COMMUNICATION SESSION

(71) Applicant: RingCentral, Inc., Belmont, CA (US)

(72) Inventors: Kira Makagon, Hillsborough, CA (US); Helen Prask, Foster City, CA (US); Yuri Ardulov, Santa Clara, CA (US); Igor Rusinov, San Francisco, CA (US); Ivan Gennadevich Anisimov, St. Petersburg (RU)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/351,369

(22) Filed: Mar. 12, 2019

(65) Prior Publication Data
US 2019/0306306 A1   Oct. 3, 2019

Related U.S. Application Data

(60) Division of application No. 15/990,483, filed on May 25, 2018, now Pat. No. 10,326,879, which is a (Continued)

(51) Int. Cl.
*H04M 3/22* (2006.01)
*G06N 20/00* (2019.01)

(52) U.S. Cl.
CPC .......... *H04M 3/2227* (2013.01); *G06N 20/00* (2019.01); *H04M 2201/38* (2013.01); *H04M 2242/30* (2013.01)

(58) Field of Classification Search
None
See application file for complete search history.

(56) References Cited

U.S. PATENT DOCUMENTS 6,275,797 B1 * 8/2001 Randic .................... G10L 25/69
                                                        704/233
8,472,349 B1   6/2013 Sun et al.
(Continued)

OTHER PUBLICATIONS

Unknown author, "MOS—Mean Opinion Score for VoIP," (May 25, 2018) [online] (retrieved from https://www.voipmechanic.com/mos-mean-opinion-score.htm), 2 pages.
(Continued)

*Primary Examiner* — Quoc D Tran
(74) *Attorney, Agent, or Firm* — Fish & Richardson P.C.

(57) ABSTRACT

Methods, systems, and apparatus, including computer programs encoded on a computer storage medium, for evaluating the quality of a communication session. One of the methods includes identifying, by a communication system, a communication session between one or more users of the communication system, wherein, during the communication session, session data is routed between a first communications device of a first user of the communication system and one or more other communications devices along a communication path; obtaining, from each of a plurality of communication nodes along the communication path, quality data relating to a quality of the communication session at the communication node; generating, using the quality data, a model input to a quality score machine learning model; and providing the model input as input to the quality score machine learning model to generate the estimated quality score for at least the portion of the communication session.

15 Claims, 8 Drawing Sheets

Related U.S. Application Data continuation of application No. PCT/RU2018/000148, filed on Mar. 12, 2018.

(56) References Cited

U.S. PATENT DOCUMENTS

| | | | |
|---|---|---|---|
| 8,737,571 B1 | 5/2014 | Seeley et al. | |
| 9,160,636 B2* | 10/2015 | Stewart | H04L 43/06 |
| 9,232,048 B2 | 1/2016 | Galvin et al. | |
| 9,325,838 B2 | 4/2016 | Assem et al. | |
| 9,602,572 B2 | 3/2017 | Dunne et al. | |
| 2002/0167937 A1* | 11/2002 | Goodman | G10L 25/69 |
| | | | 370/352 |
| 2003/0093513 A1* | 5/2003 | Hicks | H04L 41/22 |
| | | | 709/224 |
| 2006/0126798 A1* | 6/2006 | Conway | H04M 3/2236 |
| | | | 379/1.03 |
| 2006/0153174 A1 | 7/2006 | Towns-von Stauber et al. | |
| 2006/0252376 A1 | 11/2006 | Fok et al. | |
| 2008/0167952 A1 | 7/2008 | Blair | |
| 2015/0142702 A1* | 5/2015 | Nilsson | G06N 5/048 |
| | | | 706/11 |
| 2016/0028881 A1* | 1/2016 | Assem | H04M 3/2227 |
| | | | 370/252 |
| 2016/0105544 A1* | 4/2016 | Liu | H04M 3/2227 |
| | | | 379/32.01 |
| 2017/0019291 A1* | 1/2017 | Tapia | H04L 41/0631 |
| 2017/0078171 A1 | 3/2017 | Tapia et al. | |
| 2017/0134585 A1 | 5/2017 | Dunne et al. | |
| 2018/0270126 A1 | 9/2018 | Tapia | |

OTHER PUBLICATIONS

Authorized officer O. Makarova, International Search Report and Written Opinion in PCT/RU2018/000148, dated Dec. 13, 2018, 8 pages.

* cited by examiner

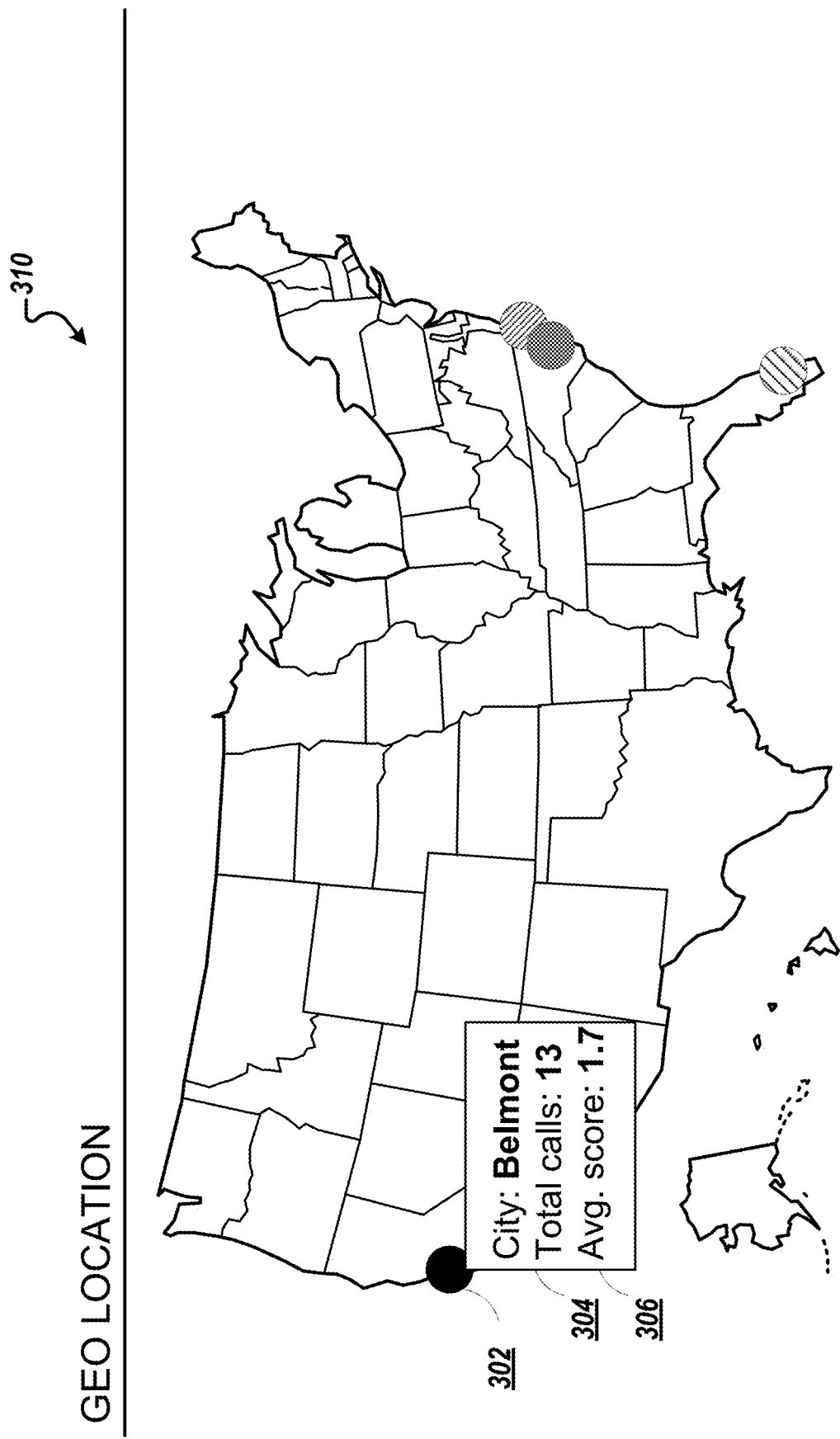

SYSTEM AND METHOD FOR EVALUATING THE QUALITY OF A COMMUNICATION SESSION

CROSS-REFERENCE TO RELATED APPLICATIONS

This application is a divisional of U.S. application Ser. No. 15/990,483, filed May 25, 2018, which is a continuation of and claims priority to PCT Application No. PCT/RU2018/000148, filed on Mar. 12, 2018. The entire disclosures of each of the prior applications are considered part of and are incorporated by reference in the disclosure of this application.

BACKGROUND

This disclosure relates to determining the quality of a communication session or of a communication stream or leg that is part of the communication session.

Users of a communication system can participate in communication sessions with other users. Examples of communication sessions may include voice-over-Internet-Protocol (VOIP) calls, videoconferences, and so on.

The quality of a communication session can be estimated using a mean opinion score (MOS). An MOS can be generated by a subjective quality evaluation test, i.e., one in which human users report their experience using a communication system, or by an algorithm developed to estimate an MOS.

SUMMARY

In general, one innovative aspect of the subject matter described in this disclosure can be embodied in methods that include the actions of identifying, by a communication system, a communication session between one or more users of the communication system, wherein, during the communication session, session data is routed between a first communications device of a first user of the communication system and one or more other communications devices along a communication path; obtaining, from each of a plurality of communication nodes along the communication path, quality data relating to a quality of the communication session at the communication node; generating, using the quality data, a model input to a quality score machine learning model, wherein the quality score machine learning model is trained to receive the model input and to generate a model output that defines an estimated quality score that characterizes the quality of at least a portion of the communication session; and providing the model input as input to the quality score machine learning model to generate the estimated quality score for at least the portion of the communication session.

In general, another innovative aspect of the subject matter described in this disclosure can be embodied in methods that include the actions of maintaining, by a communication system, data identifying, for each of a plurality of recent communication sessions, (i) an estimated quality score for the recent communication session and (ii) properties of the recent communication session; determining, by the communication system and using the estimated quality scores in the maintained data, that the quality of communication sessions having one or more particular properties has decreased; identifying users of the communication system having communication devices that are associated with the one or more particular properties; and providing data alerting the users of the communication system that are associated with the identified communication devices to the decreased quality.

In general, yet another innovative aspect of the subject matter described in this disclosure can be embodied in methods that include the actions of receiving data identifying one or more properties of a communication device of a user of the communication system; determining, using a quality score machine learning model that is trained to estimate quality of communication sessions, that a quality of future communication sessions including the communications device would be improved by modifying a particular property of the one or more properties; and performing an action related to modifying the particular property to improve the quality of the future communication sessions.

Other embodiments of these and other aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3A shows a geolocation map that displays communication session quality.

DETAILED DESCRIPTION

Figure 1:
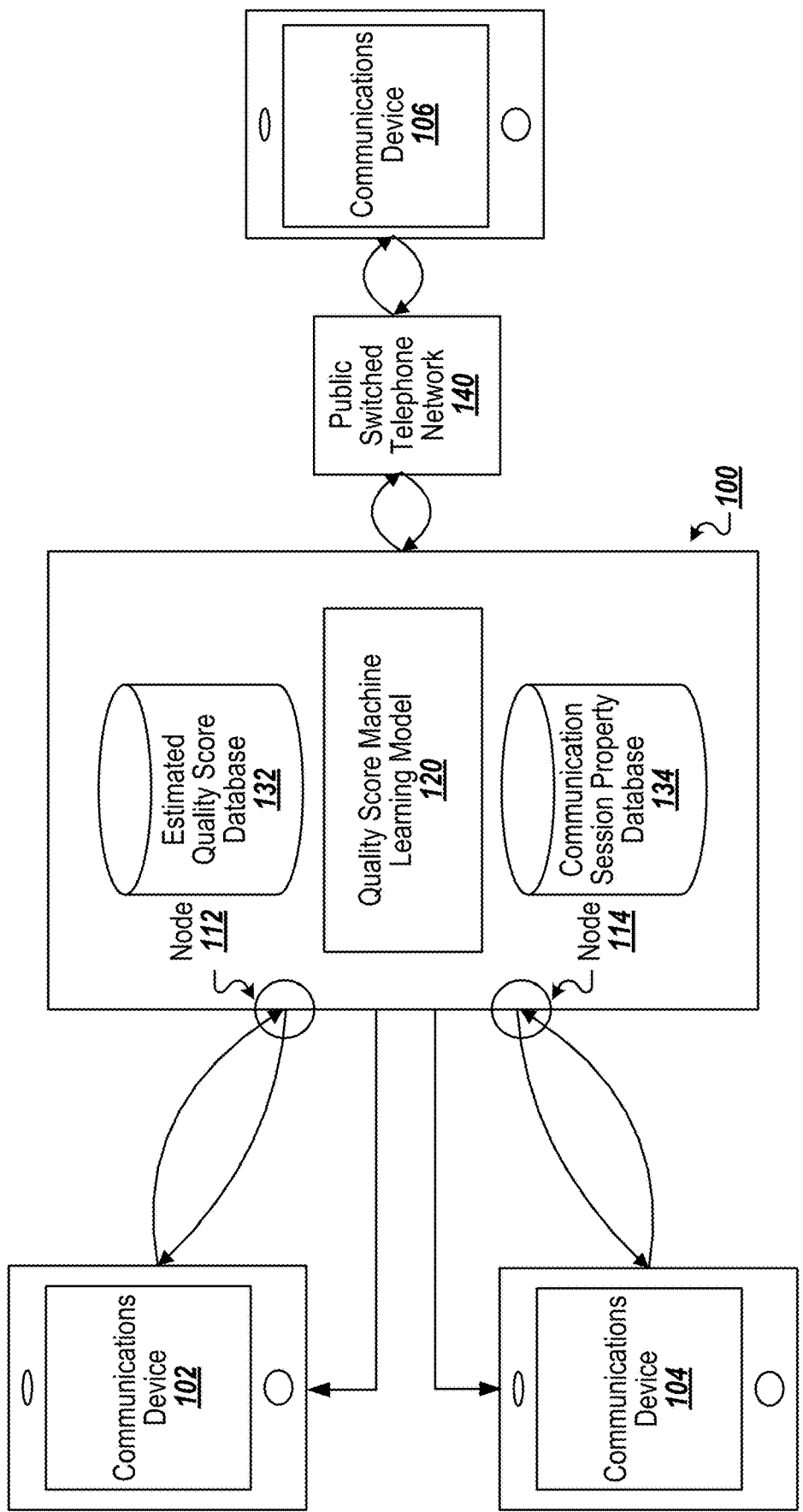
FIG. 1 shows an example communication system.

The present disclosure generally describes techniques for evaluating the quality of a communication session using a quality score machine learning model. In general, machine learning models receive an input and generate an output, e.g., a predicted output, based on the received input. Some machine learning models are parametric models and generate the output based on the received input and on values of the parameters of the model. Some machine learning models are deep models that employ multiple layers of units to generate an output for a received input. For example, a deep neural network is a deep machine learning model that includes an output layer and one or more hidden layers that each apply a non-linear transformation to a received input to generate an output.

More specifically, the quality score machine learning model described below can be trained to process a model input to generate an estimated quality score that characterizes the quality of at least a portion of the communication session.

During a communication session, session data can be routed on a communication path from a first communications device to one or more nodes along the communication path and then on to a second communications device. The communication system can collect quality data from the first and, optionally, the second communications devices, called endpoints, and from the one or more nodes.

The quality data can include information related to the quality of the communication session, e.g., MOS as computed at the various endpoints and nodes. The communication system can generate one or more model inputs using the collected quality data and then use the quality score machine learning model to generate an estimated quality score.

Particular embodiments of the subject matter described in this disclosure can be implemented so as to realize one or more of the following advantages.

The communication system described in this disclosure provides a consistent measure of call quality that can be applied to communication sessions that have a variety of properties such as endpoint, codec, and service provider. One limitation of using MOS as a measure of call quality is that MOS is not consistently implemented across different endpoint providers or service providers. For example, many standards exist for calculating MOS, and service providers tend to use a more rigorous evaluation when determining MOS as compared to endpoint providers. Instead of relying on inconsistent measures of call quality, the communication system can collect quality data associated with communication sessions that have a variety of properties, and generate an estimated quality score that is (i) consistent across all of the properties, i.e., that accurately represents the quality of the session regardless of the properties of the session, and (ii) accurately reflects how a user would perceive the quality of the session.

Another advantage of the described technology is that the communication system can leverage the estimated quality scores to improve the quality of communication sessions or to avoid potential future decreases in the quality of communication sessions. For example, the communication system can determine that a quality of a communication session would be improved by modifying one or more properties of the communication session. The communication system can alert a user of the one or more properties or preemptively improve the quality of a communication session by automatically modifying the one or more properties. The communication system can also generate a user interface that allows a user to view historical data related to the user's recent communication sessions. The historical data can include information related to the quality, volume, data, and time of recent communication sessions. The user can analyze the data presented on the user interface to predict trends in call quality and determine strategies of improving the quality of future communication sessions, e.g., by using a different endpoint, codec, or service provider.

Other features and advantages will be apparent from the description below and the drawings.

FIG. 1 shows an example communication system 100. The communication system 100 is an example of a system implemented as computer programs on one or more computers in one or more locations, in which the systems, components, and techniques described herein can be implemented.

The communication system 100 provides communication services to users of the system. In some examples, the communication system 100 may be a hosted private branch exchange (PBX) system that provides PBX services that include voice-over-Internet-Protocol (VOIP) telephony services to users of the system. The services provided by the communication system 100 can also include other kinds of communication instead of or in addition to VOIP telephony services. For example, the communication services provided by the communication system 100 can also include one or more of: short message service (SMS) messaging, faxing, instant messaging, video conferencing, e-mail, and so on.

Users of the communication system 100 can use various communications devices to communicate using the communication system 100. For example, the users of devices 102, 104, and 106 can use the communication system 100 to communicate with one another. The communications devices can be any device that can send and receive data to and from another device. For example, the communications devices can include mobile devices, e.g., smartphones or tablet computers, landline phones, e.g., plain old telephone service (POTS) phones, voice-over-Internet Protocol (VOIP) hardphones, computers that are configured to make VOIP calls by having one or more software applications installed (also referred to as "softphones"), computers that make VOIP calls through a web browser, e.g., using the Real-Time Transfer Protocol (RTP) or other network protocol, audio or video conferencing consoles, and facsimile (fax) machines.

The devices 102 and 104 can be communicatively coupled to the communication system 100 by a network. For example, the network can be a local area network (LAN), a wide area network (WAN), or a combination of the two. Other provider networks (e.g. cellular networks, wireless networks etc.) can also be used to route session data between the device and the communication system 100. In the example of FIG. 1, the devices 102 and 104 are connected to the communication system 100 by one of the previously mentioned networks, while device 106 is connected to the communication system 100 by a public switched telephone network (PSTN) 140.

A communication session is an interaction between two or more communications devices in which session data, which includes voice content, is transmitted between the two or more devices. An example of a communication session can be a VOIP call placed from communications device 102 to communications device 104. Depending on the type of communication session, other types of content may also be transmitted between the devices as part of the session data. For example, during a video conference, video content is also transmitted between the participating devices as part of the session.

To initiate a communication session, a communications device, such as the device 102, can send a request that indicates that a user of the device 102 wants to communicate with a user of another communications device, such as the device 104. In response to the request, the communication system 100 initiates a communication session between the two devices by beginning to route session data between the two devices.

During the communication session, session data can be routed between the devices of the communication system along a communication path. That is, during the session, session data transmitted by one of the communications devices is routed between one or more intermediate destinations until the session data reaches one or more final destinations, i.e., other communications devices. Intermediate destinations along the communication path can include nodes, such as nodes 112 and 114. Nodes can be hardware components or software running on one or more computers through which session data passes during a communication session. For example, nodes 112 and 114, can each be a router, a wireless access point, a gateway, a switch, an intermediate server, and so on. Communication devices can also be considered to be nodes along the communication path, i.e., endpoint nodes instead of nodes at intermediate destinations along the communication path.

The communication system 100 can facilitate communication sessions between users of the communication system 100 and external users by connecting to external devices over the PSTN 140. In the example of FIG. 1, the device 106 is communicatively coupled to the PSTN 140. In this embodiment, the PSTN 140 does not include nodes and is not connected to the communication system 100 by any nodes that are accessible to the system 100, i.e., from which the system 100 can receive quality data, as described below. Despite this, the device 106 can communicate with the devices 102 and 104 by routing session data to the PSTN 140, which can route the session data to the communication system 100 that is communicatively coupled to the devices 102 and 104. In other embodiments, the PSTN 140 can be connected to the communication system 100 by a PSTN gateway node and the system 100 can receive quality data from the PSTN gateway node.

A given communication session includes multiple portions. For example, a leg of the communication session is a portion of the session that routes session data between a starting communications device and an intermediate node along the communication path or between the intermediate node along the communication path and an ending communications device.

As another example, a stream of the communication session is a portion that routes session data from a starting communications device to a node along the communication path or from the node along the communication path to the starting communications device. That is, each leg is composed of two streams, one stream that routes data in one direction along the leg and another stream that routes data in the other direction along the leg.

The communication system 100 can generate and maintain estimated quality scores for portions of communication sessions, for entire communication sessions, or both using a quality score machine learning model 120.

Although the device 106 is not directly connected to a node, the quality score machine learning model 120 can still generate an estimated quality score for a communication session that includes the device 106. For example, if the devices 102 and 106 are part of a communication session, then the communication system 100 can collect quality data from each device of the communication system 100 as well as the node 112, which is communicatively coupled to the device 102. In embodiments where there is a PSTN gateway node at the connection between the PSTN and the system 100, the system 100 can also collect quality data from the PSTN gateway node.

The communication system 100 can maintain the estimated quality scores generated by the quality score machine learning model 120 in an estimated quality score database 132. The communication system 100 can query the estimated quality score database to obtain previously-generated estimated quality scores. That is, the communication system 100 can maintain a mapping of recent communication sessions to previously-generated estimated quality scores that correspond to the recent communication sessions.

Generally, for a given communication session, the system 100 generates the quality scores based on quality data collected from the nodes along the communication path during the session.

The quality data can include information related to locations of one or more communications devices that are communicatively coupled to the communication system 100 and participating in the session.

The quality data can also include delay and jitter information related to routing the session data between nodes along the communication path, e.g., between communication devices, between a communication device and an intermediate node, and/or between two intermediate nodes.

The quality data can further include information related to how the session data was modified after being sent from any given node along the path. For example, the quality data can include information related to the number of packets sent and received by one or more of the nodes during the communication session.

Additionally, the quality data can include an MOS that represents a user's quality of experience associated with the communication session. The MOS is determined by a node or a communication device using a scoring algorithm that may or may not be known to the communication system 100. Moreover, two nodes along the communication path may compute an MOS using two different algorithms. In some embodiments, the system normalizes each received MOS so that each normalized MOS has the same range before using it as part of the quality data.

The communication system 100 can obtain the quality data from the devices 102, 104, and 106 and the nodes 112 and 114. In embodiments where there is a PSTN gateway node, the system 100 can also obtain quality data from the PSTN gateway node for sessions that involve routing session data over the PSTN. The communication system 100 can use the quality data to generate model input for the quality score machine learning model 120 of the communication system 100 in order to generate estimated quality scores for at least a portion of a communication session.

More specifically, in some embodiments the quality score machine learning model 120 is configured to receive a model input that includes the quality data for the nodes along the communication path and to process the model input to generate an estimated quality score for the entire communication session.

In some other embodiments, the quality score machine learning model 120 is configured to receive a model input that includes quality data that is relevant to a portion of the communication session and to process the model input to generate an estimated quality score for the portion of the communication session. For example, the portion may be a stream or a leg of the communication session. In these embodiments, the system 100 can generate an overall estimated quality score for the session or for a larger portion of the session by combining the estimated scores for smaller portions.

Various properties of the communication session can impact the quality of the communication session. Therefore, the estimated quality score generated by the quality score machine learning model 120 for a particular communication session can vary depending on one or more properties of the communication session. For each recent communication session, the communication system 100 can maintain properties of the recent communication session in a communication session property database 134. The communication system 100 can query the communication session property database 134 to identify communication sessions having particular properties.

The properties maintained in communication session property database 134 can include information related to the locations of one or more communications devices that participated in a communication session. For example, the quality score machine learning model 120 can generate an estimated quality score for a communication session that is ongoing between a communications device located in Belmont, Calif., and a communications device, located in Redwood City, Calif. The communication system 100 can determine the geolocations of each communications device and store the geolocations in the communication session property database 134. The system can maintain geolocations that are resolved at multiple scales, e.g., two or more of country, zip code, city, street address, and so on.

Another property that the communication session property database 134 can maintain is a codec of the communication session. The codec of the communication session describes the compression technology used to encode or decode information communicated during the communication session. For example, codecs used by the communication system 100 can include OPUS, PCMU, G722, and G729.

The properties maintained in communication session property database 134 can also include the service providers used by the communications devices during the communication session. For example, the service providers can be internet service providers, mobile phone service providers, or application service providers.

The maintained properties can also include information characterizing the devices that participated in the communication session, e.g., data specifying the version of the software or firmware used by the device, the operating system of the device, the manufacturer or hardware specification of the device, and so on.

The maintained properties can also include the details of the session, e.g., how much data was transmitted over each leg and stream of the session, the length of the session, the communication path used by the session, and so on.

In some example embodiments, a given model input to the machine learning model 120 includes only quality data. In other example embodiments, the model input can include one or more of the above properties in addition to the quality data.

In the presently described example embodiment, the communication system 100 uses the estimated quality scores generated by the quality score machine learning model 120 to provide users of the communication system 100 information about the quality of communication sessions engaged in by the user(s). Examples of user interfaces that allow a user or system administrator to visualize the quality of various communication sessions having various properties are shown in FIGS. 2, 3A, and 3B.

Additionally, the communication system 100 can use the quality score machine learning model 120 to alert users when the quality of communication sessions having certain properties has dropped or will likely drop in the future. This is described in more detail below with reference to FIGS. 5 and 6.

Moreover, the communication system 100 can use the quality score machine learning model 120 to determine when modifying a property of a device would improve the quality of future communication sessions and then perform an action that may result in the property being modified. This is described in more detail below with reference to FIG. 6.

Figure 2:
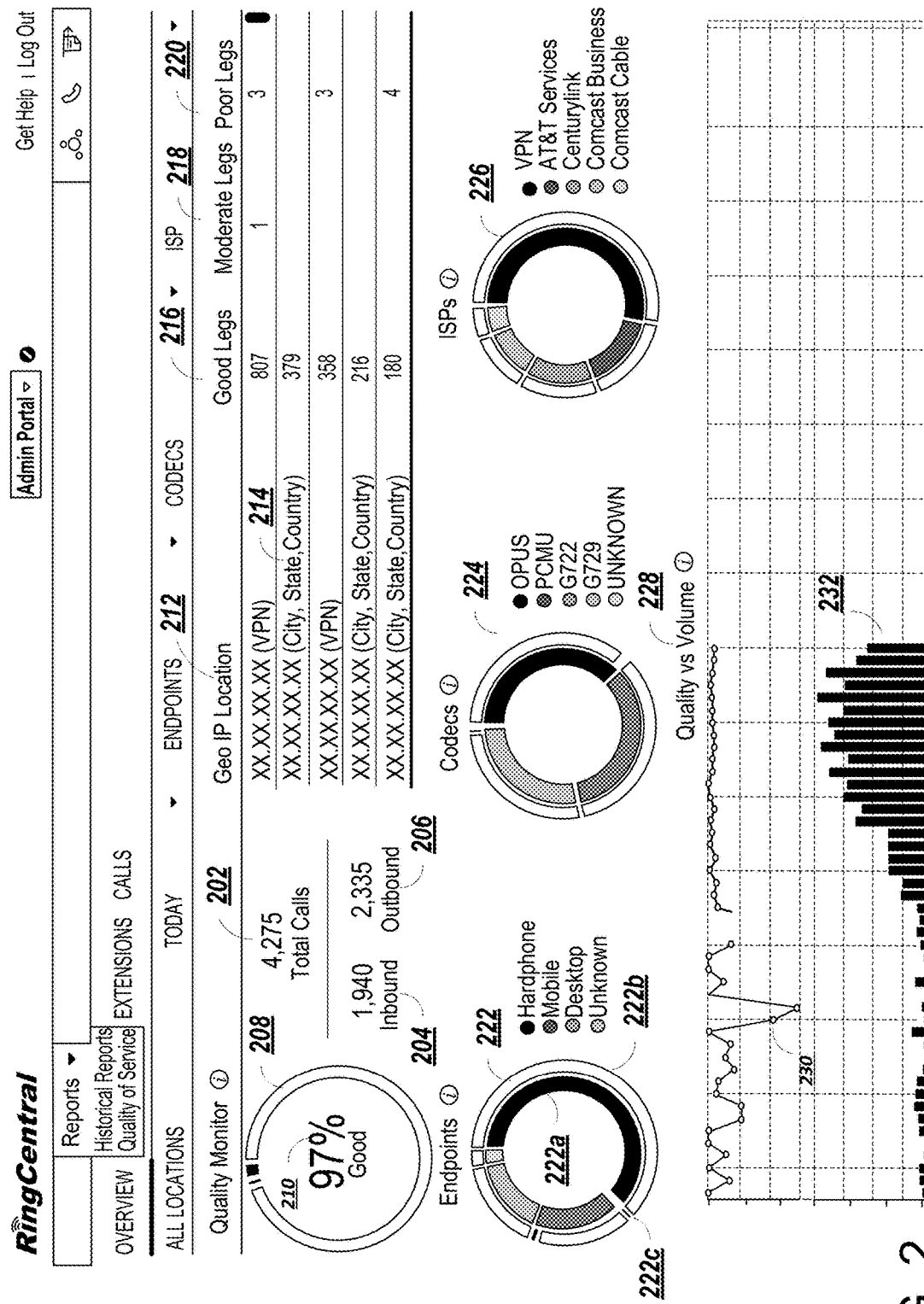
FIG. 2 shows an example user interface for presenting quality information.
Figure 3B:
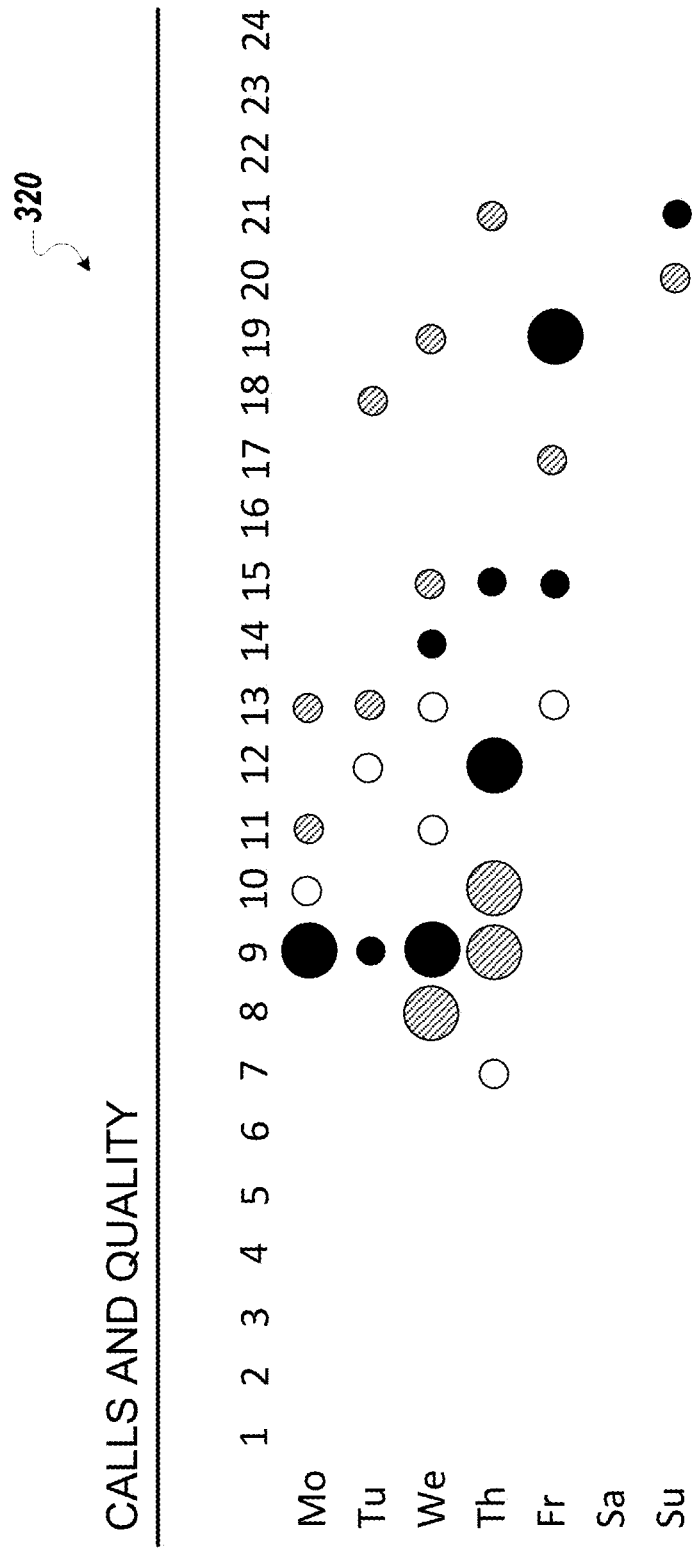
FIG. 3B shows a quality time chart that displays communication session quality.

Reference is now made to FIG. 2 which shows an example user interface 200 for presenting quality information. Generally, the user interface shows quality data for communication sessions engaged in by a particular subset of the users of the communication system 100, e.g., by users in the same organization or by users that are managed by the same corporate account. The user interface 200 can be provided by the communication system 100 for presentation to a system administrator associated with the subset of users, e.g., in a web browser on a user device of the system administrator. The system administrator of the communication system 100 can use the user interface 200 to monitor and analyze current and past communication sessions. The system administrator can also use the user interface 200 to proactively resolve issues that a future communication session may encounter.

The user interface can include total calls 202, which corresponds to the total number of communication sessions that a group of particular users have been a part of. The total calls 202 can be divided into a number of inbound communication sessions 204 and a number of outbound communication sessions 206. The communication system 100 of FIG. 1 can maintain information related to all communication sessions that have an estimated quality score. The user interface 200 can also include a quality monitor 208 that indicates an overall quality of communication sessions determined by the communication system 100. For example, the communication system 100 can determine a threshold estimated quality score that represents the minimum estimated quality score for a communication session that is considered a good quality communication session. The communication session 100 can then determine a number of good communication sessions with estimated quality scores at or above the threshold amount. The number of good communication sessions can be used to determine what percentage of total communication sessions were good communication sessions. For example, for the group of particular users associated with the user interface 200, a percentage 210 shows that 97% of the group's total communication sessions were good.

The user interface 200 can display the IP address and/or a geo IP location, such as a geo IP location 212, when available. The geo IP location 212 is associated with each of the total communication sessions. In some scenarios, an IP address may not be available, e.g., for a communication session that involves a user device that is not associated with an IP address, such as a communications device using a PSTN.

The user interface 200 can also display the geolocation of a user's communications device, or a cluster of communications devices, for each of the total communication sessions. For example, user interface 200 includes a geolocation 214 that specifies the city, state, or country of the communications device(s).

Just as the communication system 100 can determine the number of communication sessions having an estimated quality score at or above a certain threshold value, the communication system 100 can also use the estimated quality score of a communication session to determine a number of good legs 216, a number of moderate legs 218, and a number of poor legs 220 of the communication session.

User interface 200 also shows an endpoints chart 222, a codecs chart 224, and an ISPs chart 226 that each divides the total number of communication sessions into communication sessions having a respective property. Each property can be subdivided into subgroups of the property. For example, the user interface 200 includes the endpoints chart 222 that divides the total number of communication sessions into communication sessions that used one of the following subgroups of endpoints: a hardphone, a mobile phone, a desktop computer, or an unknown device. The chart 222 can also show a representation of how many communication sessions correspond to each of the subgroups. For example, a bar 222a corresponds to the number of communication sessions that used a hardphone.

The user interface 200 further includes the codecs chart 224 that divides the total number of communication sessions into communication sessions that used one of the following subgroups of codecs: OPUS, PCMU, G722, G729, or an unknown codec. The user interface 200 also includes the ISPs chart 226 that divides the total number of communication sessions into communication sessions that used one of the following subgroups of internet service providers: VPN, AT&T®, CenturyLink®, Comcast® Business, or Comcast® Cable. Each chart can include the previously-mentioned subgroups of their respective properties as well as other subgroups.

The previously-mentioned charts can also show a representation of the quality of the communication sessions per subgroup of each property. For example, the endpoints chart 222 can show, of the communication sessions that used a hardphone, a representation of those communication sessions that were determined to be either good quality or not good quality, e.g., for the communication sessions that used a hardphone, the chart can represent the percentages of good quality communication sessions using one bar of the chart and bad quality communications sessions using another bar of the chart. For example, a bar 222b corresponds to the number of good quality communication sessions that used a hardphone, while a bar 222c corresponds to the number of bad quality communication sessions that used a hardphone. Although not labeled, the codecs chart 224, and an ISPs chart 226 can also include bars, like the bars 222a, 222b, and 222c, that show a representation of the number of communication sessions of a certain subgroup, the number of good quality communication sessions per subgroup, and the number of bad quality communication sessions per subgroup, respectively.

In some embodiments, a user can determine additional information from a chart by interacting with the chart, e.g., by tapping the chart on a touchscreen device (not shown) displaying the user interface 200. For example, the additional information can include the values or percentages that a portion of the chart corresponds to. In some examples, the communications device associated with a user includes the touchscreen device, but in others the touchscreen device may be a server.

The user interface 200 can also include a Quality versus Volume chart 228 that shows a volume bar graph 230 and a quality curve 232. The volume bar graph 230 represents historical data related to the volume of calls that a group of user of the communication system 100 received during a particular timespan. The quality curve 232 represents a percentage of the volume of calls that were good calls during the timespan. FIG. 2 shows that, for the user associated with the user interface 200, the communication system 100 detected a volume of 20 communication sessions on 6 June between 3:45 AM and 4:00 AM and that 55% of the 20 communication sessions had good quality. The volume of the communication sessions can correspond to a number of communication sessions that included communications devices of the group of users.

FIG. 2 shows several ways that the communication system 100 can present information for display to a user.

FIGS. 3A and 3B show other user interfaces that the communication system 100 can use, to present for display to a user, information relating to session quality.

FIG. 3A shows a geolocation map 310 that displays communication session quality based on the geolocation and IP address corresponding to the communications devices communicatively coupled to the communication system 100. The geolocation map 310 can include a geolocation circle 302 that represents the geolocation of communications devices associated with a group of users. The geolocation map 310 can also show total calls 304 and avg. score 306 that represent the volume and average estimated quality score, respectively, of the communication sessions associated with a particular geolocation. For example, total calls 304 indicates that 13 communication sessions transpired for communications device with geolocations in Belmont, Calif., while avg. score 306 indicates that the average score for the 13 communication sessions was 1.7, on a scale from one to five. The color of a geolocation circle, such as geolocation circle 302, can be used to indicate the average estimated quality score of the volume of communication sessions corresponding to a particular geolocation. For example, red to orange circles, can indicate poor to moderate average estimated quality scores, while varying shades of green circles can indicate good average estimated quality scores, with darker shades indicating better scores than do lighter shades.

FIG. 3B shows a quality time chart 320 that displays communication session quality by both day and hour for a group of users of the communication system 100. A system administrator of the communication system 100 can use the quality time chart 320 to analyze usage and quality patterns as they relate to time and weekday of communication sessions. Like the geolocation map 310, the quality time chart 320 includes circles that are colored to indicate the average estimated quality score of a particular communication session.

The quality score machine learning model 120 generates the estimated quality scores that the communication system 100 uses to create the charts of FIG. 3.

Figure 4:
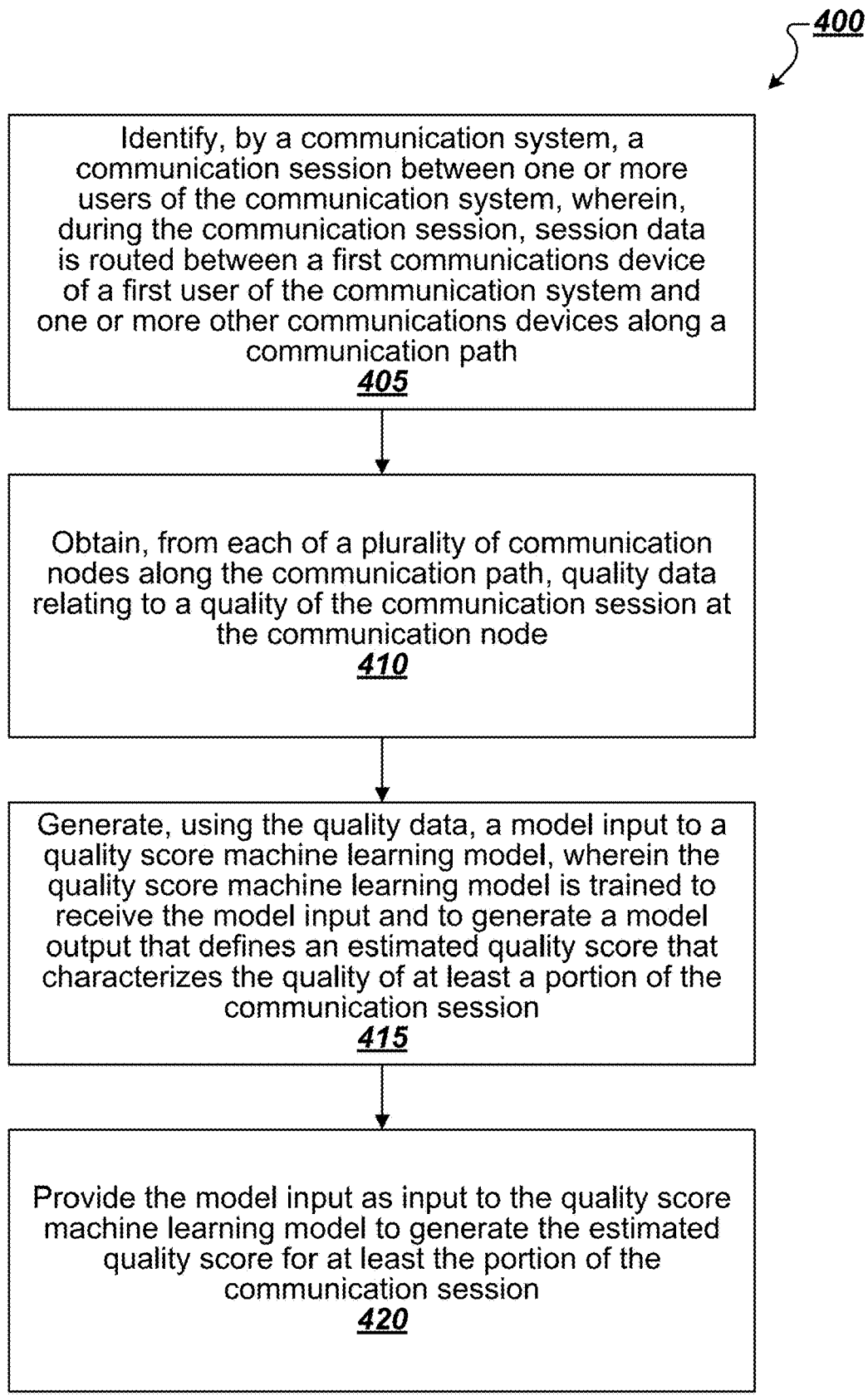
FIG. 4 is a flow diagram of an example process for estimating the quality of a communication session.

FIG. 4 is a flow diagram of an example process 400 for estimating the quality of a communication session. The process 400 can be performed by a communication system, such as the communication system 100, using one or more computers.

At step 405, a communication session between one or more users of the communication system, is identified and during the communication session, session data is routed between a first communications device of a first user of the communication system and one or more other communications devices along a communication path. For example, a first communications device can send a request that indicates that a user of the device wants to communicate with a user of second communications device. In response to the request, the communication system 100 can initiate a communication session between the two devices, e.g., by beginning to route session data from the first device to the second device along the communication path.

At step 410, quality data relating to a quality of the communication session at the communication node is obtained, from each of a plurality of communication nodes along the communication path. Each node and communications device of the communication session can transmit quality data to the communication system.

In some embodiments, the communication session can be a ping test. For example, a first communications device can send a request to a remote communications device or server and measure an amount of time elapsed between sending the request and receiving a reply from the remote communications device or server.

The quality data can include a delay of information sent. For example, a delay can be measured as session data is transferred between a communications device and a node or between two nodes. The quality data can also include a jitter associated with session data sent during the communication session. In addition, the quality data can include a difference in session data received by a node or communications device and session data sent to the node or communications device. The quality data can also include one more mean opinion scores associated with the communication session or a portion of the communication session as computed by one or more nodes along the communication path.

In step 415, a model input to a quality score machine learning model can be generated using the quality data. The quality score machine learning model is trained to receive the model input and to generate a model output that defines an estimated quality score that characterizes the quality of at least a portion of the communication session. For example, the model output can be a probability distribution over possible quality scores that can be assigned to a session or a portion of the session. The estimated score can then be determined, e.g., as the mean of the distribution or the median of the distribution or the possible score having the highest probability.

In some embodiments, the communication system can generate the model input based on quality data associated with a leg of a communication session. Accordingly, the quality score machine learning model can generate an estimated quality score using the model input that characterizes the quality of the leg.

In other embodiments, the communication system can generate the model input based on quality data associated with a stream of a communication session. The quality score machine learning model can then use the model input to characterize the quality of the stream.

In some embodiments, where the communication session has a large number, e.g., more than two, participants, e.g., a videoconference or a conference call, the communication system can determine a contribution score for each participant of the session and then include the contribution score as part of the model input for the corresponding portions of the session. The contribution score measures how much of the total content of the session the participant contributed to, e.g., what percentage of the speech during the session was generated by the participant or what percentage of the conversion during the session involved the participant.

In some embodiments, the machine learning model is a deep neural network with multiple fully-connected neural network layers, e.g., a neural network that has an input layer and one or more hidden fully-connected layers, and an output layer, e.g., a softmax output layer, that generates a respective probability for each of multiple possible quality scores. The system can then generate a single estimated quality score based on the probabilities for the possible scores, e.g., by selecting the score with the highest probability, by selecting the mean of the scores in accordance with the probabilities, or by sampling a score in accordance with the probabilities.

The communication system can use the estimated quality scores that characterize a leg of a communication path to generate an overall quality score for the communication session. For example, a communication session involving two communications devices transmitting session data along a communication path can have two legs. A first leg can route session data between a first communications device and a node along the communication path. A second leg can route session data between the node along the communication path and a second communications device.

The communication system can generate two model inputs, one for each leg. The system can generate a first model input for the first leg using quality data related to sending session data from the first communications device to the node along the communication path. For example, the quality data used to generate the first model input can include a delay in the session data sent from the first communications device to the node, a variation in jitter between the first communications device and the node, an amount of packets lost in transit between the first communications device and the node, and a MOS score associated with the leg. Similarly, the system can generate a second model input for the second leg using quality data related to session data sent from the node along the communication path to the second communication device. For example, the quality data used to generate the second model input can include a delay in the session data sent from the node to the first communications device, a variation in jitter between the node the second communications device, an amount of packets lost in transit between the node and the second communications device, and a MOS score associated with the leg.

The quality score machine learning model can then generate two estimated quality scores, one for each model input. The communication system can use both estimated quality scores to determine an overall estimated quality score for the communication session. For example, the communication system can determine the overall estimated quality score by choosing the minimum estimated quality score associated with each leg of the communication session.

The communication system can also use the estimated quality scores that characterize a stream of a communication path to generate an overall quality score for the communication session. For example, a communication session involving two communications devices transmitting session data along a communication path can have four streams. A first stream can route session data between a first communications device and a node along the communication path. A second stream can route session data between the node along the communication path and the first communications device. A third stream can route session data between the node along the communication path and a second communications device. Finally, a fourth stream can route session data between the second communications device the node along the communication path.

The communication system can generate four model inputs, one for each stream. The system can generate a first model input for the first stream using quality data related to sending session data from the first communications device to the node along the communication path. For example, the quality data used to generate the first model input can include a delay in the session data sent from the first communications device to the node, a variation in jitter between the first communications device and the node, an amount of packets lost in transit between the first communications device and the node, and a MOS score associated with the stream. Similarly, the quality score machine learning model can generate a second, third, and fourth model input for the second, third, and fourth stream using quality data related to routing session data unidirectional between the node and communication device that corresponds to each stream.

The quality score machine learning model can then generate four estimated quality scores, one for each model input. The communication system can combine the four estimated quality scores to determine an overall estimated quality score for the communication session. For example, the communication system can determine the overall estimated quality score by choosing the minimum estimated quality score associated with the four streams of the communication session. As another example, the communication system can determine the overall estimated quality score by computing the median or the mean of the estimated quality scores. As another example, the communication system can determine the overall score by determining the score that is at a specified percentile, e.g., $80^{th}$, $90^{th}$, $95^{th}$, of all of the quality scores.

In some embodiments, the communication system can train the quality score machine learning model to generate estimated quality scores for communication sessions that match user quality ratings of the communication sessions. For example, the communication system can prompt a user to provide a user quality rating for a recent communication session. The communication system can collect the user quality rating from the user. The quality score machine learning model can then use the user quality rating to adjust the values of the parameters of the machine learning model, i.e., to reduce a measure of difference between the model output generated by the model and the user quality rating collected from the user using a supervised learning technique, e.g., stochastic gradient descent with backpropagation. In some cases, the model can be periodically re-trained as new user quality ratings are collected.

In step 420, the model input is provided as input to the quality score machine learning model to generate the estimated quality score for at least the portion of the communication session.

Figure 5:
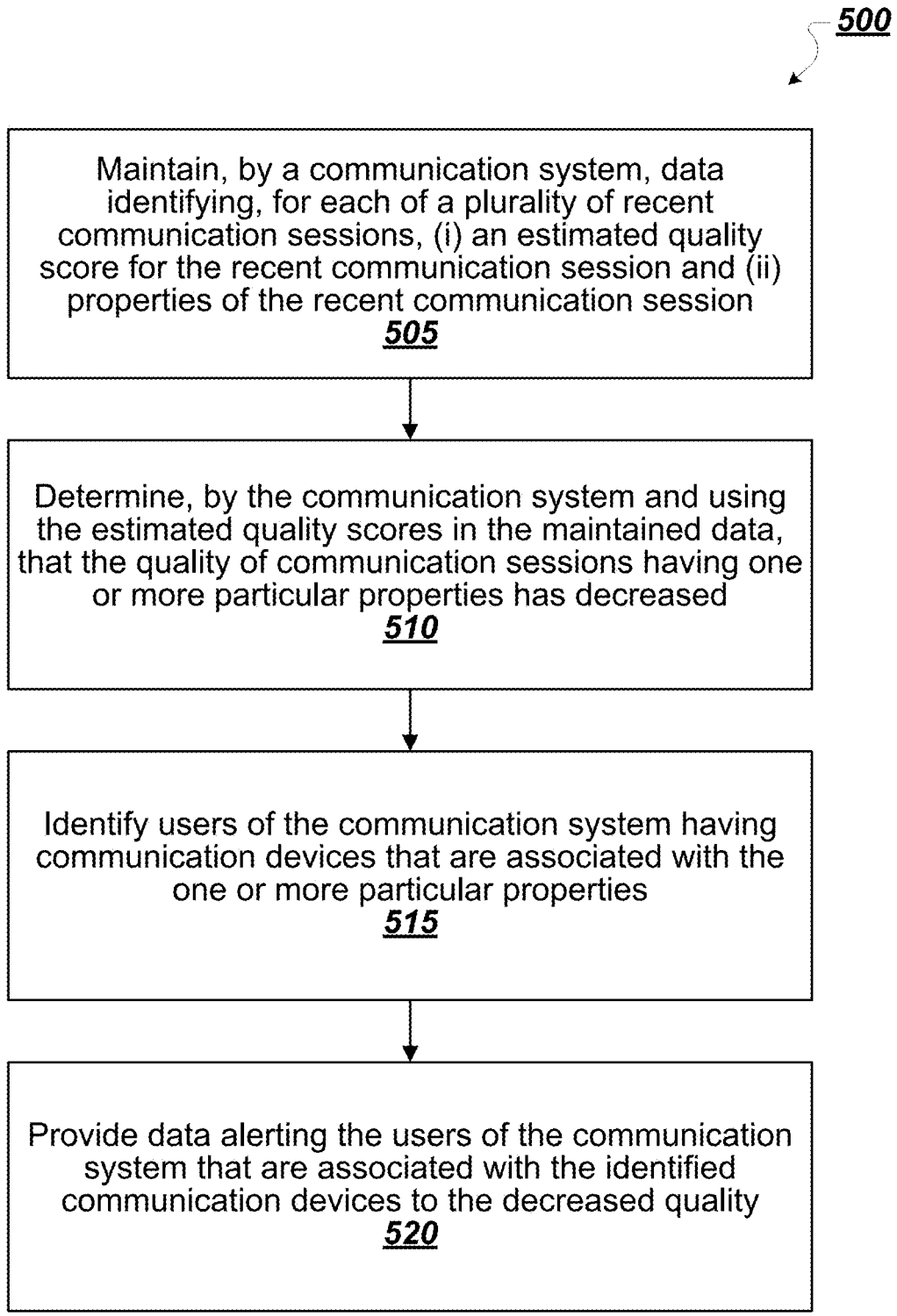
FIG. 5 is a flow diagram of an example process for alerting users of decreased quality of service.

FIG. 5 is a flow diagram of an example process for alerting users of decreased quality of service. The process 500 can be performed by a communication system, such as the communication system 100, using one or more computers.

In step 505, for each of a plurality of recent communication sessions, data identifying (i) an estimated quality score for the recent communication session and (ii) properties of the recent communication session is maintained. The communication system can maintain the data identifying the estimated quality scores for the recent communication sessions in an estimated quality score database. The communication system can maintain the properties of the recent communication session in a communication session property database. A recent communication session is a communication session that is ongoing or that has recently been completed.

In step 510, the quality of communication sessions having one or more particular properties is determined to have decreased using the estimated quality scores in the maintained data. In some embodiments, the communication system can determine that at least one estimated quality score of the one or more recent communication sessions having the one or more particular properties is lower than a threshold estimated quality score. In some embodiments, the threshold estimated quality score can represent a minimum estimated quality score that the communication system determines is a good quality communication session. In other embodiments, a user of the communication system can set the threshold estimated quality score.

In other embodiments, the one or more recent communication sessions are more recent than one or more older communication sessions having the one or more properties, and the threshold quality score is based on estimated quality scores for the one or more older communication sessions. For example, the communication system can compare an estimated quality score for a recent communication session with an estimated quality score for a communication session that is older than the recent communication session, using the estimated quality score for the older communication session as the threshold estimated quality score. Thus, in these embodiments, the quality is determined to have decreased when the scores for the recent sessions are below historical averages for sessions having the particular properties.

The system can perform step 510 periodically for each of a predetermined set of properties to determine whether quality of sessions having those properties is decreasing. Once a decrease is determined, the system can decrease the period between performing step 510 to determine whether the quality has continued to degrade and continue performing step 510 at the decreased period to analyze the quality until the quality has returned to an acceptable level.

In step 515, users of the communication system having communications devices that are associated with the one or more particular properties are identified. The communication system can maintain a mapping of communications devices to the most recent properties associated with the communications devices. The communication system can use this mapping to determine the communications devices associated with a particular property. For example, the particular property can be a particular service provider, and the communication system can identify each user having a communications device that is using or has recently used the particular service provider.

In step 520, users of the communication system that are associated with the identified communications devices are alerted to the decreased quality. In some embodiments, the communication system can generate an alert that includes information corresponding to the one or more particular properties. The alert can include data that identifies the particular property and indicates that the quality of sessions associated with the particular property can be expected to decrease. The alert can also include historical data related to a timespan in which the communication system determined that the quality of communication sessions having one or more particular properties decreased. The alert can further include an estimated decrease in the quality of communication sessions for communications devices that are associated with the one or more particular properties. The estimated decrease in quality can be determined from the estimated quality scores for the recent communication sessions having the one or more particular properties.

The communication system can communicate the alert to the communications devices that are associated with the one or more particular properties. For example, the communication system can provide the alert for display on a user interface provided by the communication system. A system administrator can view the alert using the user interface. As another example, the alert can be a message, e.g., an SMS or MMS message, or other communication transmitted from the communication system to a user communication device.

Figure 6:
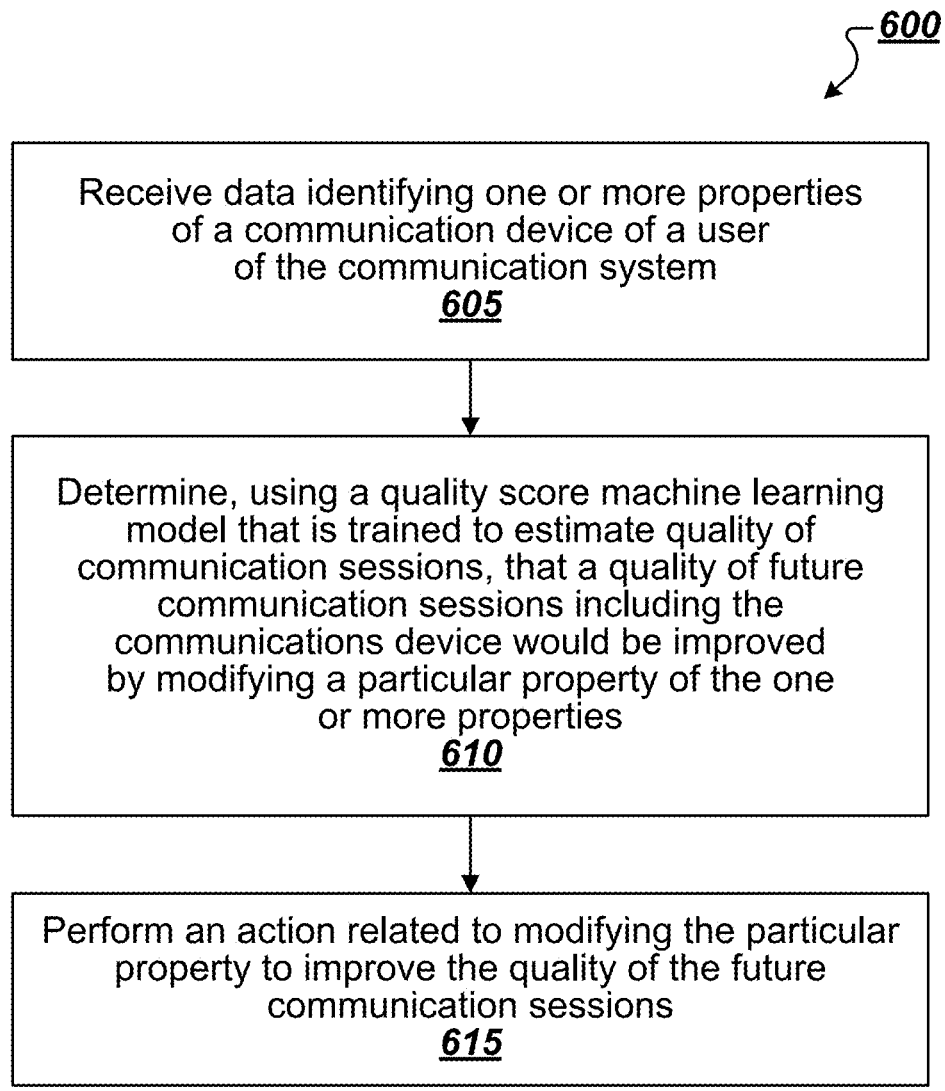
FIG. 6 is a flow diagram of an example process for performing an action to improve the quality of future communication sessions.

FIG. 6 is a flow diagram of an example process for performing an action to improve the quality of future communication sessions. The process 600 can be performed by a communication system, such as the communication system 100, using one or more computers.

In step 605, data identifying one or more properties of a communications device of a user of the communication system is received. The communication system can maintain a mapping of communications devices to the most recent properties associated with the communications devices. Not only can the communication system can use this mapping to determine the communications devices associated with a particular property, the communication system can also use this mapping to identify one or more properties that are associated with a particular communications device.

In step 610, it is determined, using a quality score machine learning model that is trained to estimate quality of communication sessions, that a quality of future communication sessions including the communications device would be improved by modifying a particular property of the one or more properties.

In some embodiments, to determine that the quality of future communication sessions would be improved by modifying the particular property, the communication system can generate multiple estimated quality scores each corresponding to communication sessions of communications devices that have a different set of properties.

For example, the communication system can generate a first model input for the quality score machine learning model that indicates that the communications device has the particular property. For example, the communication system can determine a set of properties associated with the communications device, and the set of properties can include the particular property. The communication system can then initiate a ping test that simulates a communication session of a communications device having the determined set of properties. The communication system can collect quality data relating to a quality of the ping test. Just as the communication system can generate model input from the quality data of a communication session, the communication system can also generate a first model input for the ping test. Because the ping test simulates a communication session of a communications device having the particular property, the first model input is indicative of a communications device that has the particular property. As another example, the system can use baseline values for quality data, in addition to the particular property, when generating the model input.

The communication system can provide the first model input as input to the quality score machine learning model to generate a first estimated quality score. The generated estimated quality score corresponds to a communication session that has the particular property.

The communication system can then generate a second model input for the quality score machine learning model that indicates that the particular property has been modified. The communication system can generate the second model input in a similar way as described above. For example, the communication system can initiate a ping test that simulates a communication session of a communications device having nearly the same determined set of properties as the communications device described above, except with the addition of the modified property. The communication system can then collect quality data relating to a quality of the ping test, and generate the second model input from the quality data. In other example embodiments, the communication system can use the same baseline values, but with the particular property changed to the modified property.

The communication system can provide the second model input as input to the quality score machine learning model to generate a second estimated quality score corresponding to a communication session having the modified property.

The communication system can determine whether the first estimated quality score is lower than the second estimated quality score. If the first estimated quality score, i.e., that corresponding to a communication session associated with the particular property, is lower than the second estimated quality score by some threshold value, i.e., that corresponding to a communication session associated with the modified property, then the communication system can determine that the quality of future communication sessions would be improved by modifying the particular property.

In other embodiments, to determine that the quality of future communication sessions would be improved by modifying the particular property the communication system can use maintained data for each of a plurality of communication sessions.

As described above, the communication system can maintain data identifying, for each of a plurality of recent communication sessions, an estimated quality score for the recent communication session and properties of the recent communication session.

The communication system can identify, from the maintained data, one or more first recent communication sessions from the plurality of recent communication sessions, the one or more first recent communication sessions having the particular property. The communication system can maintain a mapping of recent communication sessions to properties of the recent communication sessions. Using this mapping, the communication system can identify one or more communication sessions that have the particular property.

The communication system can identify one or more second recent communication sessions from the plurality of recent communication sessions, the one or more second recent communication sessions having mostly the same properties as the one or more first recent communication sessions, with the exception of a modified particular property, and a higher estimated quality scores than one or more estimated quality scores for the one or more first recent communication session. Not only can the communication system maintain a mapping of recent communication sessions to properties of the recent communication sessions, it can also maintain a mapping of recent communication sessions to previously-generated estimated quality scores that correspond to the recent communication sessions. Using this mapping, the communication session can determine one or more recent communication sessions, having the modified particular property. From these communication sessions, the communication system can determine the one or more second recent communication sessions that have a higher estimated quality score than one or more estimated quality scores for the one or more first recent communication sessions. By determining that there are one or more second recent communication sessions that have a higher estimated quality score than one or more estimated quality scores for the one or more first recent communication sessions, the communication system can also determine that the quality of future communication sessions including the communications device would be improved by having the modified property associated with the one or more second recent communication sessions.

In step 615, an action, related to modifying the particular property to improve the quality of the future communication sessions, is performed. In some embodiments, the communication system can automatically change the particular property of the communications device, so that it has the modified property. For example, the communication system can modify a codec used by the communications device. As another example, the communication system can modify a service provider of the communications device, e.g., the internet service provider, mobile phone service provider, or application service provider, i.e., cause the communications device to use a different service provider when participating in communication sessions. For example, the system can enable or disable a WiFi connection of a mobile device. In other embodiments, the communication system can provide an alert for presentation on the communications device or for presentation on a communication device of a system administrator. For example, the alert can be presented on a user interface of the communication system. The alert can identify the particular property to be modified to improve the quality of the future communication sessions.

Figure 7:
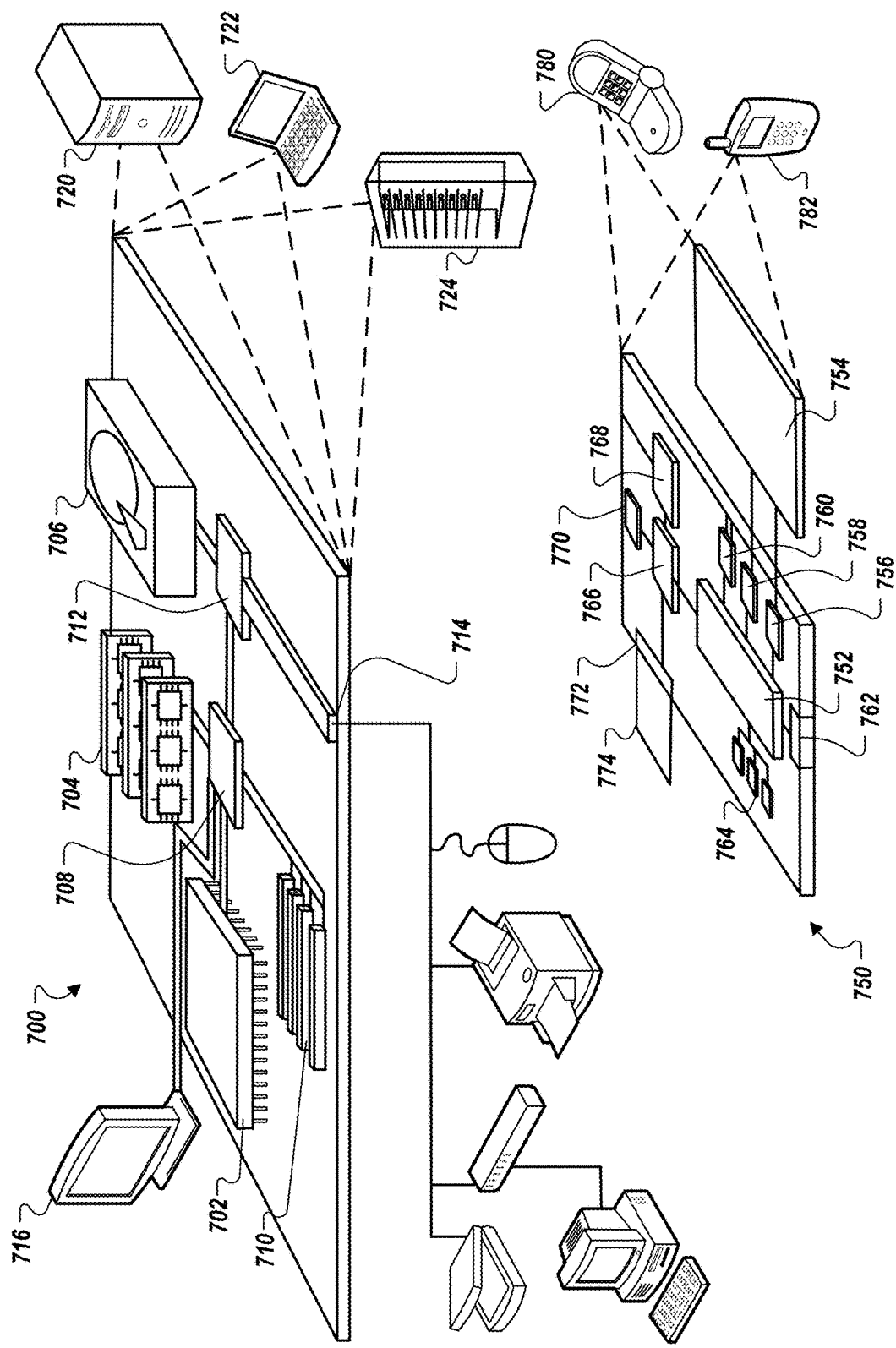
FIG. 7 shows example computing devices.

FIG. 7 is a block diagram of example computing devices 700 and 750. For example, either of the computing devices 700 and 750 may be one of the communications devices 102, 104, and 106 of FIG. 1. As another example, the computing device 700 may be one of the computers included in the communication system 100 of FIG. 1. Computing device 700 can represent various forms of digital computers, such as laptops, desktops, workstations, personal digital assistants, servers, blade servers, mainframes, and other appropriate computers. Computing device 750 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit embodiments of the inventions described and/or claimed herein.

As shown in FIG. 7, computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other embodiments, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some embodiments, the memory 704 is a computer-readable medium. In some embodiments, the memory 704 is a volatile memory unit or units. In some other embodiments, the memory 704 is a non-volatile memory unit or units.

The storage device 706 is capable of providing mass storage for the computing device 700. In some embodiments, the storage device 706 is a computer-readable medium. In various example embodiments, the storage device 706 may be a floppy disk device, a hard disk device, an optical disk device, or a tape device, a flash memory or other similar solid-state memory device, or an array of devices, including devices in a storage area network or other configurations. In some embodiments, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The highspeed controller 708 manages bandwidth-intensive operations for the computing device 700, while the low speed controller 712 manages lower bandwidth intensive operations. Such allocation of duties is exemplary only. In some embodiments, the high-speed controller 708 is coupled to memory 704, display 716 (e.g., through a graphics processor or accelerator), and to high-speed expansion ports 710, which may accept various expansion cards (not shown). In the embodiments, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In some embodiments, the memory 764 is a computer-readable medium. In some embodiments, the memory 764 is a volatile memory unit or units. In some other embodiments, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In some embodiments, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a short-distance wireless data transfer mechanism, WiFi, or other such transceiver (not shown). In addition, a GPS receiver module may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying, by a communication system, a communication session between one or more users of the communication system, wherein, during the communication session, session data is routed between a first communications device of a first user of the communication system and one or more other communications devices along a communication path;
   obtaining, from each of a plurality of communication nodes along the communication path, quality data relating to a quality of the communication session at the communication node;
   generating, using the quality data, a model input to a quality score machine learning model, wherein the quality score machine learning model is trained to receive the model input and to generate a model output that defines a respective estimated quality score for each of multiple portions of the communication path that characterizes the quality of a respective portion of the communication path; and
   generating an overall estimated quality score for the communication session, comprising providing the model input as input to the quality score machine learning model to generate the respective estimated quality score for each of the multiple portions of the communication path.

2. The method of claim 1, wherein the plurality of communication nodes comprises the first communications device and one or more non-communication device nodes.

3. The method of claim 1, wherein the model input comprises quality data from nodes associated with a portion of the communication session.

4. The method of claim 3, wherein generating an overall estimated quality score for the communication session comprises combining a plurality of estimated quality scores generated by the model for the multiple portions of the communication path.

5. The method of claim 3, wherein the respective portion of the communication path is a stream of the communication path that routes session data from a starting communication device to a node of the plurality of communication nodes along the communication path or from the node of the plurality of communication nodes along the communication path to the starting communication device.

6. The method of claim 3, wherein the respective portion of the communication path is a leg of the communication path, the leg being a portion of the communication path that routes session data between a starting communications device and a node of the plurality of communication nodes along the communication path or between a node of the plurality of nodes of communication nodes along the communication path and an ending communications device.

7. The method of claim 1, further comprising:
   training the quality score machine learning model to generate estimated quality scores for communication sessions in a set of training data that match user quality ratings of the communication sessions.

8. The method of claim 1, wherein the quality data comprises information related to locations of the first communications device and the one or more other communications devices.

9. The method of claim 1, wherein the quality data comprises a delay related to routing the session data between a source communications device and a destination communications device.

10. The method of claim 1, wherein the quality data comprises a jitter related to routing the session data between a source communications device and a destination communications device.

11. The method of claim 1, wherein the quality data comprises a difference in session data received by the destination communications device and session data sent by the source communications device.

12. The method of claim 1, wherein the quality data comprises a mean opinion score computed at one or more of the nodes.

13. The method of claim 1, wherein the communication session comprises a ping test.

14. A non-transitory computer storage medium encoded with a computer program, the computer program comprising instructions that when executed by one or more computers cause the one or more computers to perform operations comprising:
   identifying, by a communication system, a communication session between one or more users of the communication system, wherein, during the communication session, session data is routed between a first communications device of a first user of the communication system and one or more other communications devices along a communication path;
   obtaining, from each of a plurality of communication nodes along the communication path, quality data relating to a quality of the communication session at the communication node;
   generating, using the quality data, a model input to a quality score machine learning model, wherein the quality score machine learning model is trained to receive the model input and to generate a model output that defines a respective estimated quality score for each of multiple portions of the communication path that characterizes the quality of a respective portion of the communication path; and
   generating an overall estimated quality score for the communication session, comprising providing the model input as input to the quality score machine learning model to generate the respective estimated quality score for each of the multiple portions of the communication path.

15. A system comprising one or more computers and one or more storage devices storing instructions that when executed by the one or more computers cause the one or more computers to perform operations comprising:
   identifying, by a communication system, a communication session between one or more users of the communication system, wherein, during the communication session, session data is routed between a first communications device of a first user of the communication system and one or more other communications devices along a communication path;
   obtaining, from each of a plurality of communication nodes along the communication path, quality data relating to a quality of the communication session at the communication node;
   generating, using the quality data, a model input to a quality score machine learning model, wherein the quality score machine learning model is trained to receive the model input and to generate a model output that defines a respective estimated quality score for each of multiple portions of the communication path that characterizes the quality of a respective portion of the communication path; and
   generating an overall estimated quality score for the communication session, comprising providing the model input as input to the quality score machine learning model to generate the respective estimated quality score for each of the multiple portions of the communication path.

* * * * *